United States Patent [19]

Gudeman

[11] Patent Number: 5,215,134
[45] Date of Patent: Jun. 1, 1993

[54] MATCHED EDGE JOINTER

[76] Inventor: Bill J. Gudeman, R.R. 1, Box 125, Congerville, Ill. 61729

[21] Appl. No.: 942,609

[22] Filed: Sep. 9, 1992

[51] Int. Cl.⁵ .............................. B23Q 3/00; B27C 5/10
[52] U.S. Cl. ............................... 144/144 R; 83/455; 144/134 D; 144/137; 144/371; 269/129; 269/291; 269/303; 409/125
[58] Field of Search ............... 83/455; 269/129, 290, 269/291, 303, 97; 144/136 C, 134 D, 144 R, 144.5, 371, 137; 409/125, 130

[56] References Cited

U.S. PATENT DOCUMENTS

| 2,651,333 | 9/1953 | Spinney | 269/290 |
|---|---|---|---|
| 2,848,785 | 8/1958 | Bachli et al. | 269/129 |
| 4,077,292 | 3/1978 | Cole | 83/455 |
| 4,128,118 | 12/1978 | Ede | 144/136 C |
| 4,215,731 | 8/1980 | Maynard | 144/136 C |
| 4,456,043 | 6/1984 | Stocks | 144/136 C |
| 4,529,343 | 7/1985 | Adams | 144/134 D |
| 4,688,613 | 8/1987 | Bassett | 144/136 C |
| 4,840,209 | 6/1989 | Reneau | 144/371 |
| 4,860,809 | 8/1989 | Cotton et al. | 144/371 |

Primary Examiner—W. Donald Bray
Attorney, Agent, or Firm—Philip L. Bateman

[57] ABSTRACT

A matched edge jointer is used with a router to produce matched edge surfaces on two workpieces. The guide contains an elongated guide bar, an elongated platform mounted and centered longitudinally under the guide bar, an elongated base adjustably mounted under the platform, and a means for adjusting the gap between the platform and the base. The platform has a width such that the distance from the edge of the guide bar to the edge of the platform is equal to or greater than the offset of the router, and is made of a material which is readily trimmed by the router before use. The device is customized for a particular router before being used with a workpiece. Two workpieces with matched edge mating surfaces are produced by alternately working the two workpieces using opposite sides of the jointer.

8 Claims, 2 Drawing Sheets

MATCHED EDGE JOINTER

FIELD OF THE INVENTION

This invention relates to woodworking. More particularly, this invention relates to a device for, and a method of, guiding a router along two workpieces to make matched edge surfaces for jointing.

BACKGROUND OF THE INVENTION

A common operation in woodworking is the preparation of matched edge surfaces on two workpieces so they can be jointed together by gluing and/or other fastening means. For the maximum strength and best appearance, the mating surfaces of the two workpieces must align precisely without any gaps. A jointer-planer is routinely used by professional woodworkers to prepare such mating surfaces. A jointer-planer contains a rotating cutter head and two table surfaces whose elevations are slightly offset. The workpiece is lifted and then fed along the lower table toward the upper table where the rotating cutter head removes a portion of the workpiece, the thickness of which is equal to the difference in elevation between the two tables. Unfortunately, the jointer-planer is so large, cumbersome, and expensive that it is not feasible for the amateur woodworker to own or use one. Accordingly, it would be desirable for the amateur woodworker to have a tool which could perform the function of the jointer-planer, but at a fraction of its cost and size. More specifically, it would be desirable to have a matched edge jointer which could be used in conjunction with a router, a power tool owned by most amateur woodworkers.

Woodworking guides for use with a router are disclosed in Reneau, U.S. Pat. No. 4,840,209, issued Jun. 20, 1989, and in Cotton et al., U.S. Pat. No. 4,860,809, issued Aug. 29, 1989. The Reneau guide includes a rail member and a router trolley for making a precise cut on a workpiece. The Cotton et al. guide has two levels which enable mating cuts to be made on two workpieces with an alternating-contour-surface router bit. With both the Reneau and Cotton et al. guides, the router is used on the same side of the guide. Therefore, whatever deviation exists in the guide is doubled in the joint formed between the two workpieces. For example, assume the guide contains a uniformly curving concave bow of 0.05 inches (such a deviation from straightness inevitably occurs over time due to bending, warping, and so on). The two workpieces produced will each contain this same concave bow and the resulting joint will exhibit a gap of 0.10 inches at the center, large enough to be noticeable and to be unacceptable. Accordingly, neither guide is suitable for extended use in making precise matched edge surfaces.

SUMMARY OF THE INVENTION

A general object of this invention is to provide an improved woodworking tool. A more particular object is to provide a tool which, when used in conjunction with a router, performs a function similar to the jointer-planer, but is smaller, less expensive, and easier to use. Another general object of this invention is to provide an improved method of guiding a router to make matched edge surfaces on two workpieces for jointing.

I have invented an improved device for guiding a router to make matched edge surfaces on two workpieces. The device comprises: (a) An elongated guide bar having two parallel sides against both sides of which a router passes during use of the device; (b) An elongated platform mounted and centered longitudinally under the guide bar, the holder having a length approximately equal to the guide bar, having substantially flat upper and lower surfaces, having a width such that the distance from the edge of the guide bar to the edge of the platform is equal to or greater than the offset of the router, and further being of a material that is readily trimmed by the router, so that the platform can be customized for the particular router by being trimmed by the router before the device is used to make a matched edge surface on a workpiece; (c) An elongated base having a length approximately equal to that of the guide bar and platform, the base having a substantially flat upper surface, having a width such that it extends laterally a distance less than the platform so that it does not interfere with the router during use, and being mounted under the platform; and (d) A means for connecting the guide bar-platform assembly to the base which enables the gap between the platform and the base to be adjusted so that a workpiece can be inserted between the two and held in position while it is being worked.

I have also invented a method of guiding a router to make matched edge surfaces on two workpieces. The method comprises: (a) Providing a router; (b) Providing a device comprising: (i) an elongated guide bar having two parallel sides against both sides of which the router passes during use of the device; (ii) an elongated platform mounted and centered longitudinally under the guide bar, the holder having a length approximately equal to the guide bar, having substantially flat upper and lower surfaces, having a width such that the distance from the edge of the guide bar to the edge of the platform is equal to or greater than the offset of the router, and further being of a material that is readily trimmed by a router, so that the platform can be customized for the router by being trimmed by the router before the device is used to make a matched edge surface on a workpiece; (iii) an elongated base having a length approximately equal to that of the guide bar and platform, the base having a substantially flat upper surface, having a width such that it extends laterally a distance less than the platform so that it does not interfere with the router bit during use, and being mounted under the platform; and (iv) a means for connecting the guide bar-platform assembly to the base which enables the gap between the platform and the base to be adjusted so that a workpiece can be inserted between the two and held in position while it is being worked; (c) Customizing the woodworking guide for the router by passing the router along each side of the guide bar to trim the platform; (d) Inserting a first workpiece into the guide with the edge to be matched extending beyond one side of the platform; (e) Trimming the first workpiece by passing the router along that side of the guide bar; (f) Removing the first workpiece from the guide; (g) Inserting the second workpiece into the guide with the edge to be matched extending beyond the other side of the platform; and (h) Trimming the second workpiece by passing the router along that side of the guide bar.

This device is relatively small and lightweight, has no moving parts, is easy to use, and is inexpensive. The use of the device enables even an amateur woodworker to make precise matched edge surfaces.

DETAILED DESCRIPTION OF THE INVENTION

Figure 1:
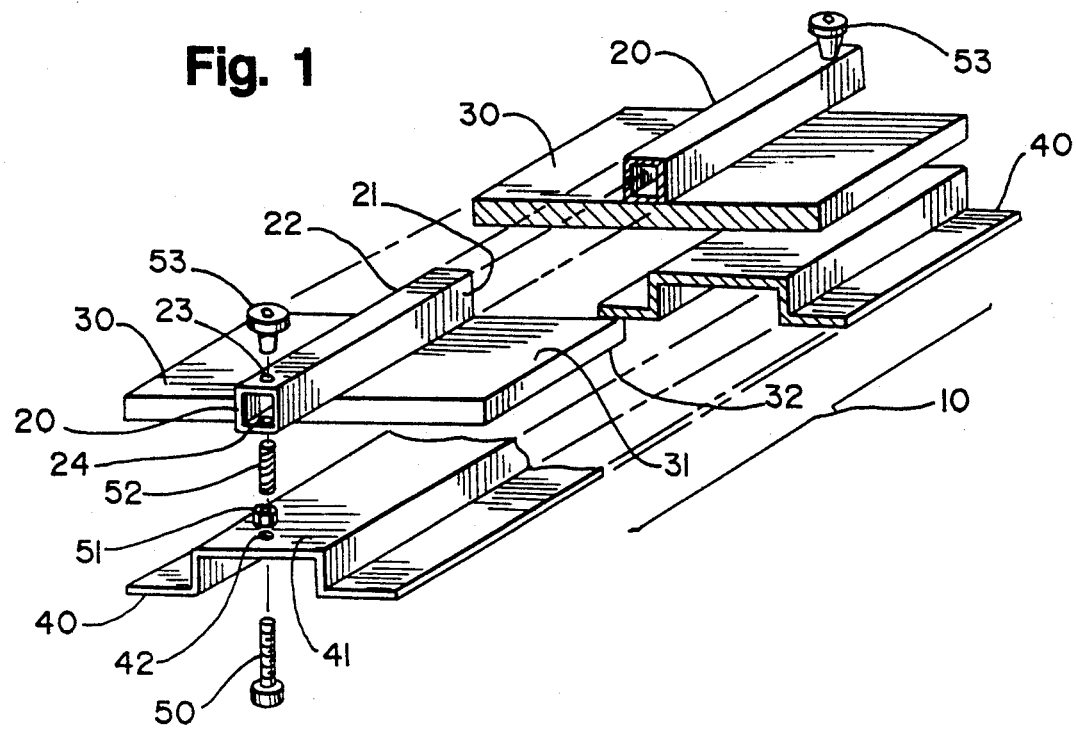
FIG. 1 is a perspective, exploded view of the matched edge jointer of this invention.

This invention is best understood by reference to the drawings. FIG. 1 is a perspective, partially-exploded view of one embodiment of the matched edge jointer 10 of this invention. The jointer includes a guide bar 20, a platform 30, and a base 40. For clarity, the guide bar, platform, and base are shown divided. Each of these three components is of approximately the same length. As will be seen, they are of a length greater than the dimension to be worked on the workpiece. Accordingly, if a workpiece having a width of 4 feet (1.2 meters) is to be trimmed to produce a matched edge surface, or otherwise worked, the guide bar, platform, and base are of a length at least about 4.5 feet (1.4 meters), preferably about 5 feet (1.5 meters). The jointer is generally about 5 feet (1.5 meters) to 8 feet (2.4 meters) in length.

The guide bar has two parallel sides 21 and 22 against which a router passes alternately during use of the device to prepare matched edge surfaces on two workpieces. As explained below, it is not essential that the guide bar be perfectly straight, only that the two sides be parallel. In other words, a bow in the guide bar does not prevent the preparation of perfectly mating surfaces on two workpieces. The guide bar has a cross section such that a router remains an equal distance from the center of the guide bar as it passes along its length. It is preferred that the guide bar have substantially vertical sides, as shown in the FIG. 1 embodiment. The guide bar has holes 23 and 24 at each end for use in connecting it to the base. A preferred guide bar is a section of 1.5-inch steel square tubing having a gauge of about 10 to 18. This tubing is readily available commercially, is strong enough to resist dents and bending, and yet is relatively light in weight.

The platform has a substantially flat upper surface 31 upon which the router rides and a substantially flat lower surface 32 which contacts the workpiece. The platform is mounted and centered longitudinally under the guide bar. The means by which the platform is mounted to the guide bar is not critical to the invention. Conventional fastening means such as screws, nuts and bolts, adhesives, and the like are satisfactory, provided there are no protrusions extending below the surface of the platform. A countersunk screw or bolt passing upward into the guide bar is preferred. As previously mentioned, the platform has a length approximately equal to or slightly less than that of the guide bar. As shown in FIG. 1, the platform is preferably shorter in length so that the connection means between the guide bar and the base does not pass through the platform.

Figure 2:
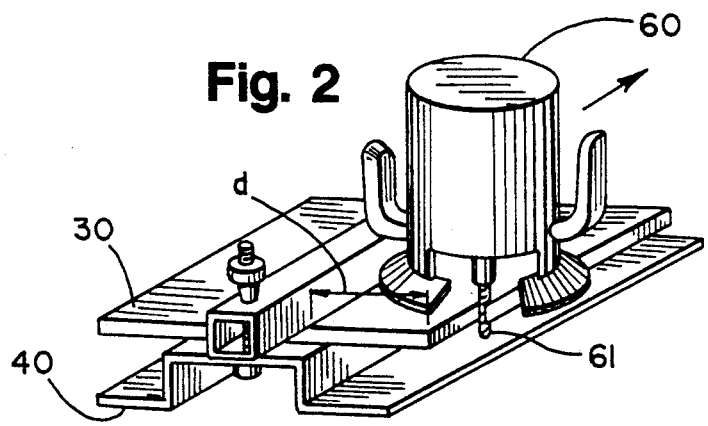
FIG. 2 is a perspective view of the matched edge jointer being customized for use with a particular router.

The platform has a width such that the distance from the edge of the guide bar to the edge of the platform is equal to or greater than the offset of the router, i.e., the distance between the outside edge of the router base and its bit. The reason for this width requirement is best understood by reference to FIG. 2. Referring now to FIG. 2, the matched edge jointer is shown with the platform flush against the base. A router 60 which will be used with the jointer is fitted with the type of bit 61 which will be used. The router is then turned on and passed along the length of the jointer with the edge of the router base in contact with the guide bar. The platform is trimmed by the router as it passes. After trimming, the distance between the edge of the guide bar and the edge of the platform, labeled d in FIG. 2, is equal to the offset of the router. After one side of the platform has thus been trimmed, the process is repeated on the other side. As a result of this trimming, the platform is now customized for a particular router and bit. The platform is made of a material, and is of a thickness, such that it is rigid, capable of supporting the weight of a router, and yet is readily trimmed by the router. The platform is generally formed of wood. A preferred material is a sheet of particle board or plywood having a thickness of about 0.5 to 2 inches (about 1.2 to 5.1 cm) and covered on both faces with plastic laminate. The laminate gives an improved appearance to the guide, reduces warping due to the absorption of moisture, and also provides a low-friction surface upon which the router passes during use.

Returning now to FIG. 1, the guide bar-platform assembly is connected to the base. The base is elongated and has a length approximately equal to that of the guide bar and platform. The base has a substantially flat upper surface 41 for making contact with the workpiece or platform. The upper surface has a width such that it does not interfere with the router bit during use. A hole 42 at each end of the base is used for connecting it to the guide bar-platform assembly.

The guide bar-platform assembly is connected at each end to the base using threaded carriage bolt 50, nut 51, spring 52, and knob 53. The nut holds the bolt in position on the base. The spring applies a sufficient upward force against the guide bar-platform assembly so as to create a gap between the two to ease insertion of the workpiece. However, it is preferred that the spring constant be small enough that the guide bar-platform assembly can be readily brought into contact with the base by tightening the knobs by hand. As can be seen, this contact is facilitated when the platform is shorter than the guide bar and base so that the compressed spring is able to occupy a space having the thickness of the platform. After a workpiece is inserted, the two knobs at the ends are tightened to hold the workpiece in position. Various alternative means can be used for this purpose, including cam-operated handles, clamps, and the like.

The first step in using the woodworking guide is, as previously discussed, to customize the guide for the particular router and bit which will be used. The guide is customized by trimming both sides of the platform as shown in FIG. 2. If a change is made to a router and/or bit which reduces the offset, the platform can easily be retrimmed. If, on the other hand, a change is made resulting in a wider offset, it is preferred to replace the platform with a wider piece, which can then be trimmed to recustomize the woodworking guide.

Figure 3:
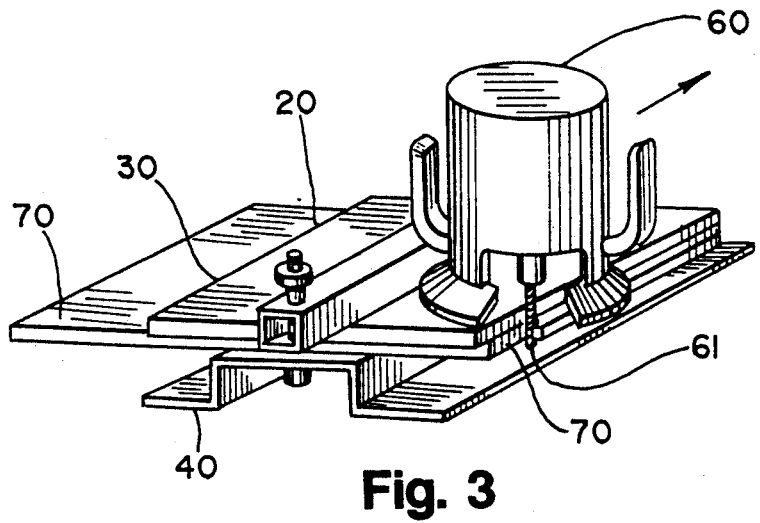
FIG. 3 is a perspective view of a workpiece being trimmed using the matched edge jointer.

After customizing, a workpiece 70 is inserted and tightened between the guide bar-platform assembly as shown in FIG. 3. The workpiece is positioned so that it extends a short distance beyond the platform. If more than about one inch is to be removed, it is preferred to first use a saw to cut off all but about one-half inch and then to use the router. The router is then passed along the guide, trimming that portion of the workpiece extending beyond the platform.

Figure 4A:
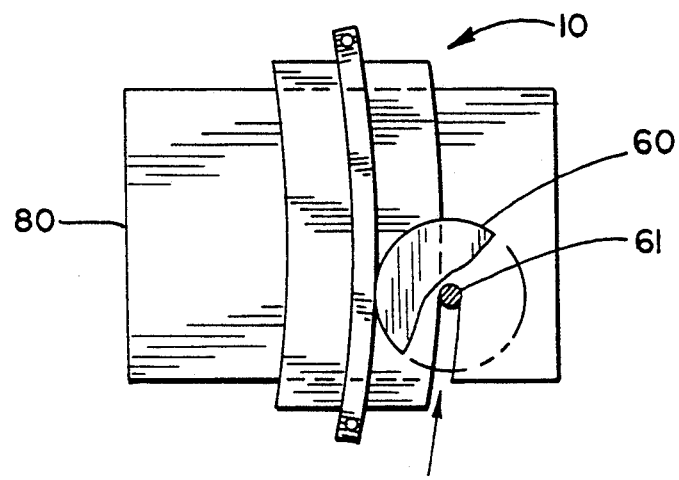
FIG. 4A is a top view of the matched edge jointer and a first workpiece being trimmed.
Figure 4B:
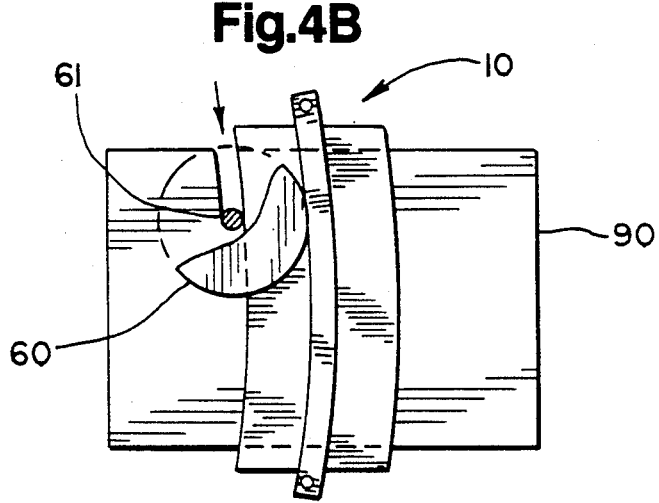
FIG. 4B is a top view of the matched edge jointer and a second workpiece being trimmed.
Figure 4C:
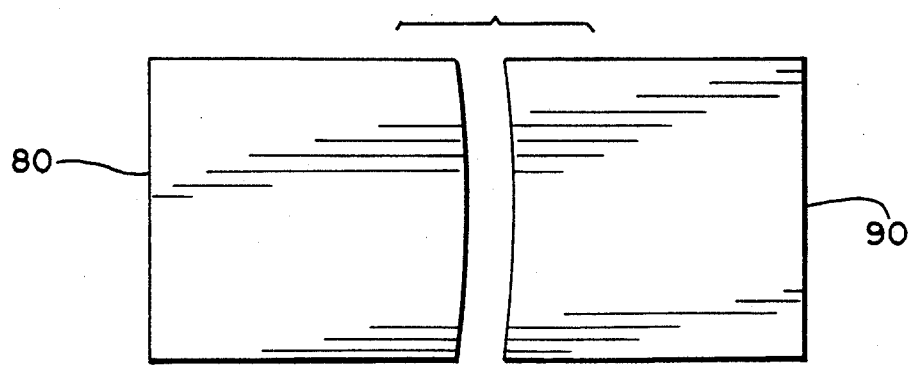
FIG. 4C is a top view of the workpieces of FIGS. 4A and 4B being jointed together along their matched edge surfaces.

FIGS. 4A, 4B, and 4C illustrate the way in which the matched edge jointer is used to make perfectly mating surfaces on two workpieces, 80 and 90. FIG. 4A is a top view of the matched edge jointer with workpiece 80 inserted and being trimmed. The matched edge jointer is shown with a greatly-exaggerated rightward bow to show that it is not essential that the jointer be perfectly straight in order to produce perfectly mating workpieces. FIG. 4B is a top view of the matched edge jointer with workpiece 90 inserted and being trimmed for mating with workpiece 80. As can be seen, the opposite side of the jointer is used in this step. FIG. 4C shows the mating of the workpieces 80 and 90 and the resulting perfect fit despite the bows on the mating surfaces. If the two workpieces have a width less than the jointer, they are inserted and trimmed in the same lateral portion of the jointer so that the matched edges align perfectly.

The matched edge jointer of this invention can also be used as a guide in performing other woodworking operations with a router such as dadoing and rabbeting.

I claim:

1. A device for guiding a router to make matched edge surfaces on two workpieces, the device comprising:
    (a) an elongated guide bar having two parallel sides against both sides of which a router of the type having an offset distance between the outside edge of its base and its bit passes during use of the device;
    (b) an elongated platform mounted and centered longitudinally under the guide bar, the platform having a length approximately equal to the guide bar, having substantially flat upper and lower surfaces, having a width such that the distance from the edge of the guide bar to the edge of the platform is equal to or greater than the offset of the router, and further being of a material which is readily trimmed by a router, so that the platform can be customized for a particular router by being trimmed by the router before the device is used to make a matched edge surface on a workpiece;
    (c) an elongated base having a length approximately equal to that of the guide bar and platform, the base having a substantially flat upper surface, having a width such that it extends laterally a distance less than the platform so that it does not interfere with the router bit during use, and being mounted under the platform; and
    (d) a means for connecting the guide bar-platform assembly to the base which enables the gap between the platform and the base to be adjusted so that a workpiece can be inserted between the two and held in position while it is being worked.

2. The device of claim 1 wherein the parallel sides of the guide bar are substantially vertical.

3. The device of claim 2 wherein the platform comprises wood and has a thickness of about 0.5 to 2 inches.

4. The device of claim 3 wherein the platform is covered on its top surface with plastic laminate.

5. A method of guiding a router to make matched edge surfaces on two workpieces, the method comprising:
    (a) providing a router of the type having an offset distance between the outside edge of its base and its bit;
    (b) providing a device comprising: (i) an elongated guide bar having two parallel sides against both sides of which the router passes during use of the device; (ii) an elongated platform mounted and centered longitudinally under the guide bar, the platform having a length approximately equal to the guide bar, having substantially flat upper and lower surfaces, having a width such that the distance from the edge of the guide bar to the edge of the platform is equal to or greater than the offset of the router, and further being of a material that is readily trimmed by a router, so that the platform can be customized for the router by being trimmed by the router before the device is used to make a matched edge surface on a workpiece; (iii) an elongated base having a length approximately equal to that of the guide bar and platform, the base having a substantially flat upper surface, having a width such that it extends laterally a distance less than the platform so that it does not interfere with the router bit during use, and being mounted under the platform; and (iv) a means for connecting the guide bar-platform assembly to the base which enables the gap between the platform and the base to be adjusted so that a workpiece can be inserted between the two and held in position while it is being worked;
    (c) customizing the woodworking guide for the router by passing the router along each side of the guide bar to trim the platform;
    (d) inserting a first workpiece into the guide with the edge to be matched extending beyond one side of the platform;
    (e) trimming the first workpiece by passing the router along that side of the guide bar;
    (f) removing the first workpiece from the guide;
    (g) inserting the second workpiece into the guide with the edge to be matched extending beyond the other side of the platform; and
    (h) trimming the second workpiece by passing the router along that side of the guide bar.

6. The method of claim 5 wherein the parallel sides of the guide bar of the device provided are substantially vertical.

7. The method of claim 6 wherein the platform of the device provided comprises wood and has a thickness of about 0.5 to 2 inches.

8. The method of claim 7 wherein the platform of the device provided is covered on its top surface with plastic laminate.

* * * * *